US012194749B2

(12) United States Patent
Burke

(10) Patent No.: US 12,194,749 B2
(45) **Date of Patent: *Jan. 14, 2025**

(54) SYSTEM FOR REMOVING CONDENSATE FROM PRINTHEAD

(71) Applicant: MEMJET TECHNOLOGY LIMITED, Leopardstown (IE)

(72) Inventor: David Burke, North Ryde (AU)

(73) Assignee: Memjet Technology Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,245

(22) Filed: Apr. 23, 2024

(65) Prior Publication Data

US 2024/0269982 A1 Aug. 15, 2024

Related U.S. Application Data

(63) Continuation of application No. 17/749,914, filed on May 20, 2022, now Pat. No. 11,993,084.

(60) Provisional application No. 63/192,492, filed on May 24, 2021.

(51) Int. Cl.
*B41J 2/165* (2006.01)

(52) U.S. Cl.
CPC ....... *B41J 2/16585* (2013.01); *B41J 2/16517* (2013.01); *B41J 2/16535* (2013.01); *B41J 2/16544* (2013.01); *B41J 2/16526* (2013.01); *B41J 2002/1655* (2013.01)

(58) Field of Classification Search
CPC ................ B41J 2/16585; B41J 2/16517; B41J 2/16535; B41J 2/16544; B41J 2/16526; B41J 2002/1655
See application file for complete search history.

(56) References Cited

U.S. PATENT DOCUMENTS 11,993,084 B2 * 5/2024 Burke .................... B41J 25/304
2009/0128593 A1 5/2009 Jorba et al.

* cited by examiner

*Primary Examiner* — Geoffrey S Mruk
(74) *Attorney, Agent, or Firm* — Garson & Gutierrez, PC

(57) ABSTRACT

A printing device includes: an inkjet printhead having a row of ink ejection devices; a lift mechanism configured for raising and lowering the printhead between a maintenance position and a printing position; a conveyor tape positioned below the printhead in the printing position, the conveyor tape defining a slot aligned with the row of ink ejection devices; a tape movement mechanism for moving the tape longitudinally along the length of the printhead; and a condensate scraper positioned for scraping condensate away from an underside of the conveyor tape. The tape movement mechanism is configured to move the tape along the printhead during printing, thereby conveying condensate accumulated on an underside of the tape away from the printhead.

11 Claims, 3 Drawing Sheets

SYSTEM FOR REMOVING CONDENSATE FROM PRINTHEAD

CROSS-REFERENCE TO RELATED APPLICATIONS

This application is a continuation of, and claims the benefit of priority to, U.S. patent application Ser. No. 17/749,914 filed May 20, 2022, of the same title, now U.S. Pat. No. 11,993,084 which issued on May 28, 2024, which in turn claims the benefit of priority to U.S. Provisional Patent Application Ser. No. 63/192,492 filed May 24, 2021, of the same title, the contents of each of the foregoing being incorporated herein by reference in its entirety.

FIELD

This invention relates to a system for removing condensate from a printhead. It has been developed primarily to enable continuous print runs with less frequent maintenance interventions.

BACKGROUND

In some inkjet printing systems, a web of print media is fed continuously past one or more fixed printheads at high speeds. A perennial problem in such printing systems is a condensation of water vapor on a lower surface of the printhead. During printing, the environment around the printhead has a high humidity due to hot ink droplets in flight and evaporation of water vapor when ink droplets strike print media. Thermal ink ejection processes also raise the humidity in the environment of the printhead.

Water vapor in the printhead environment will tend to condense on any relatively cool surface of a printhead assembly. For example, water vapor may condense on an encapsulant material protecting wirebonds connected to printhead chips. Water vapor may also condense on an underside chip-mounting surface of an ink manifold, which is cooled by ink supplied to the manifold.

Condensation on the underside surfaces of a printhead assembly is problematic for print quality. Firstly, the condensate may drip from the surface directly onto the print media web causing undesirable mottling of a printed image. Secondly, the condensate may migrate back onto the nozzle plate of the printhead via capillary action whereupon water is sucked into inkjet nozzles. If inkjet nozzle chambers become filled with water instead of ink, this has a highly deleterious effect on print quality until the water is cleared from the printhead. Typically, in high-speed pagewide inkjet printheads, the effects of condensation are typically manifested in mottling and streaks in the printed image.

Condensate on printhead assemblies can generally be removed by wiping during a maintenance intervention. However, in a web-based printing system, wiping typically requires stopping a web feed mechanism, lifting the printhead away from the media web, performing the wiping operation, and then lowering the printhead back into a printing position before printing can be recommenced. Aside from the obvious disadvantage of increased downtime, intermittently stopping the web feed mechanism is highly undesirable in, for example, a high speed press. Web feed mechanisms are designed to run continuously for long periods; therefore, stopping the press for frequent maintenance interventions has a very significant effect on overall print speeds, interferes with the operation of downstream web cutters, and ultimately affects the economic feasibility of installing an inkjet web press as opposed to a traditional offset press. It is a goal of pagewide inkjet technology providers to replace traditional offset presses with a lower-cost, more convenient digital solution.

From the foregoing, it will therefore be appreciated that it would be desirable to provide a means for mitigating the effects of condensation during high speed printing.

U.S. Pat. No. 9,776,415 describes a system for removing condensate from a printhead, whereby the media web itself is briefly deflected onto the printhead.

U.S. Pat. No. 10,906,313 describes a printhead having a heating layer positioned between an ink manifold and a shield plate surrounding print chips. The heating layer minimizes condensation of water vapor onto the shield plate.

SUMMARY

In a first aspect, there is provided a printing device comprising: an inkjet printhead having a row of ink ejection devices; a lift mechanism configured for raising and lowering the printhead between a maintenance position and a printing position; a conveyor tape positioned below the printhead in the printing position, said conveyor tape defining a slot aligned with the row of ink ejection devices; and a tape movement mechanism for moving the tape longitudinally along the length of the printhead, wherein the tape movement mechanism is configured to move the tape along the printhead during printing, thereby conveying condensate accumulated on an underside of said tape away from the printhead.

The invention according to the first aspect advantageously provides a means of mitigating the effects of condensation build-up on the printhead during printing.

Preferably, the slot is at least twice a length of the printhead.

Preferably, an upper surface of the tape contacts a lower surface of the printhead.

Preferably, the tape is tensioned between a pair of pulleys positioned at opposite ends of the printhead.

Preferably, the pulleys are positioned above or below a media feed path.

Preferably, a movement direction of the tape is perpendicular to a media feed direction.

Preferably, the tape movement mechanism is configured to reciprocally move the conveyor tape along the printhead during printing.

Preferably, the printing device further comprises a condensate scraper positioned for scraping condensate away from an underside of the tape.

Preferably, the condensate scraper is offset from the media feed path.

Preferably, the tape is comprised of a non-absorbent polymer.

Preferably, the tape includes an unslotted portion, said unslotted portion having a length equal to or greater than a length of the printhead.

Preferably, the lift mechanism is configured to position the printhead in a spitting position at a predetermined height above the tape, said spitting position being intermediate the maintenance position and the printing position; and the unslotted portion of the tape, when aligned with and positioned opposite the printhead in the spitting position, receives ink spitted from the printhead on an upper surface thereof.

Preferably, the printing device further comprises an ink scraper positioned for scraping ink away from the upper surface of the tape.

BRIEF DESCRIPTION OF DRAWINGS

A specific embodiment of the present invention will now be described by way of example only with reference to the accompanying drawings, in which.

DESCRIPTION

Figure 1:
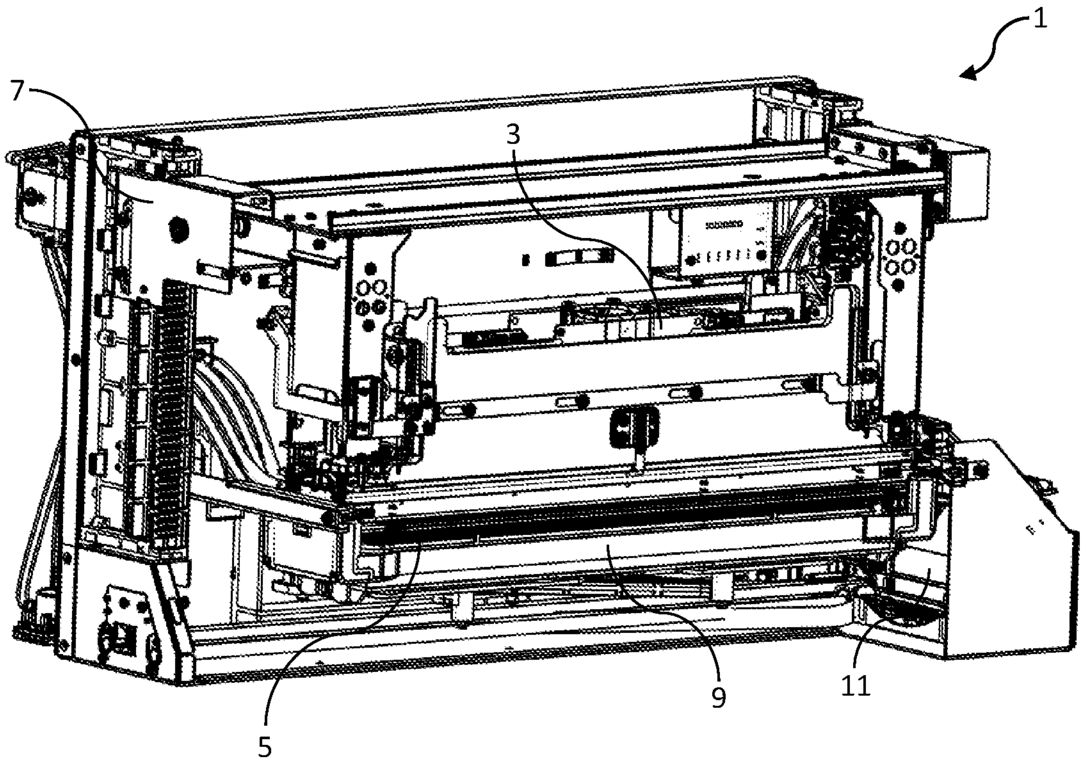
FIG. 1 is a perspective view of a printing device.

FIG. 1 shows a printing device 1 of the type described in U.S. Pat. No. 10,967,638 (the contents of which are incorporated herein by reference). The printing device 1 includes a print module 3 comprising a replaceable pagewide printhead 5 having a plurality of ink ejection devices in the form of print chips. The print module 3 can be raised and lowered relative to a media feed path or platen by means of a lift mechanism 7. In the lowered position, the printhead is positioned for printing onto a media web fed through a print zone. In the raised position, maintenance operations such as capping and wiping may be performed on the printhead without cutting a media web. As shown in FIG. 1, the printhead 5 is raised and capped using a laterally movable capper 9. In this raised position, the printhead 5 may also be wiped using a longitudinally movable wiper 11, which is parked at one end of the printhead in FIG. 1. Further explanation of such capping and wiping operations are described in detail in U.S. Pat. Nos. 10,967,638 and 10,076,917, the contents of which are incorporated herein by reference.

Figure 2:
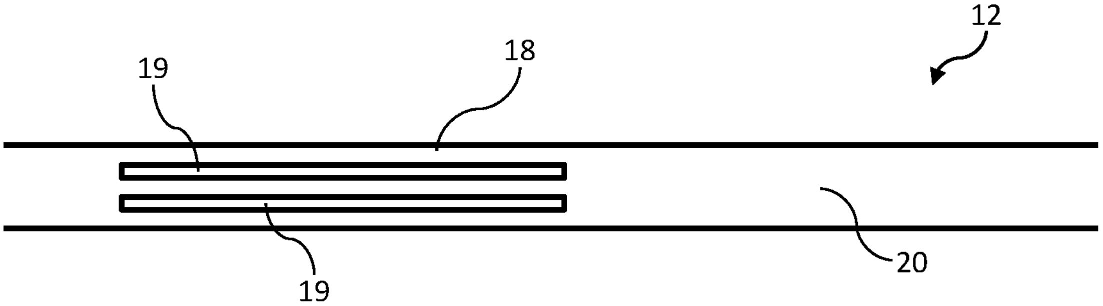
FIG. 2 is a schematic plan view of a conveyor tape.
Figure 3A:
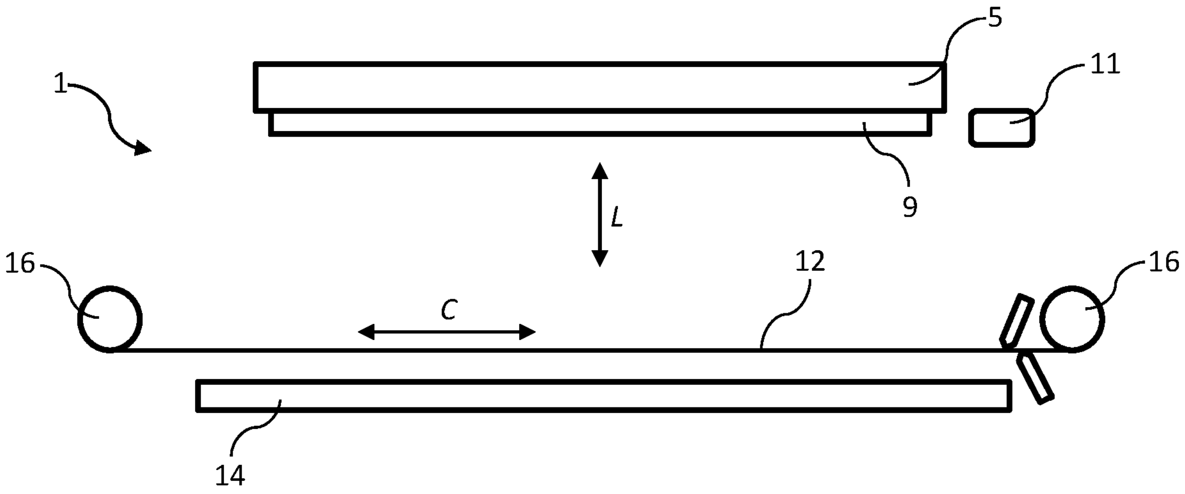
FIGS. 3A-C are schematic side views of a printing device in maintenance, spitting and printing positions.
Figure 3B:
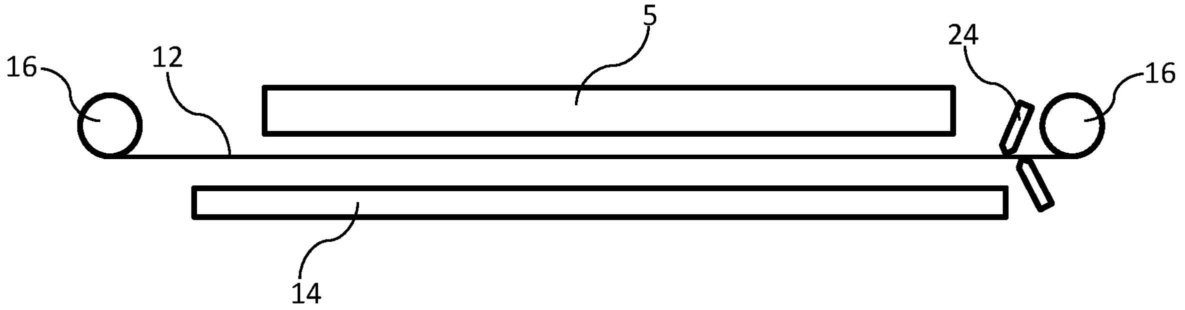
Figure 3C:
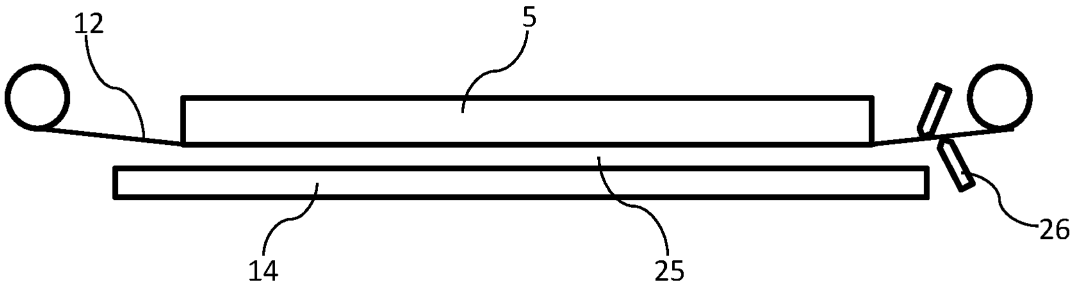

FIGS. 3A-C are schematic side views of the printing device 1 incorporating a conveyor tape 12, which is shown partially, in plan view in FIG. 2. As shown in FIGS. 3A, the media path is into the page, such that a lift path L of the printhead, the media feed path and a conveyor tape path C are all mutually orthogonal.

The conveyor tape 12 is positioned at a predetermined height above a media path (incorporating a platen 14) and tensioned between a pair of pulleys 16. The pulleys 16 provide a two-way tape movement mechanism, thereby enabling reciprocal movement of the conveyor tape 12 therebetween. Additional pulleys (not shown) may be positioned either above or below the media path to direct the conveyor tape 12 towards, for example, a cleaning station. In some embodiments, the conveyor tape 12 may be in the form of an endless belt positioned either above the media path or partially above and below the media path.

The conveyor tape 12 is typically formed of a non-absorbent polymer material and has a slotted portion 18, in the form of a pair of longitudinal slots 19 shown in FIG. 2, and an unslotted portion 20. The pair of longitudinal slots 19 correspond with and are positioned to align with a pair of rows of print chips 22 on the printhead 5. Typically, the longitudinal slots 20 are longer than the printhead 5 to allow reciprocal movement of the conveyor tape 12 during printing. Of course, in the case of printheads having only one row of print chips, the conveyor tape 12 will, likewise have only one corresponding slot.

Initially, as shown in FIG. 3A, the printhead 5 is in its maintenance position corresponding to the position shown in FIG. 1. The printhead 5 is capped with the capper 9 and the wiper 11 is parked at one end of the printhead. When the printhead 5 required for printing, the capper 9 is removed and, typically, the printhead is wiped by traversing the wiper 11 longitudinally along the printhead (right to left as shown in FIG. 3A). Wiping removes any ink and debris from the nozzle face of the printhead 5 and, in the case of a suction wiper, primes the inkjet nozzles for printing. After wiping, the printhead 5 is lowered along the lift path L towards the conveyor tape 12.

As shown in FIG. 3B, the printhead 5 is positioned in a spitting position at a predetermined height above the conveyor tape 12. In this spitting position, the conveyor tape 12 is moved to a position whereby the unslotted portion 20 is aligned with the printhead 5, and the printhead spits ink from its nozzles onto an upper surface of the conveyor tape. Thus, the upper surface of the unslotted portion 20 of the conveyor tape 12 functions as a spittoon for receiving spitted ink from the printhead 5. Ink received on the upper surface of the conveyor tape 12 is removed by moving the conveyor tape, by means of the pulleys, past an ink scraper 24.

Figure 4:
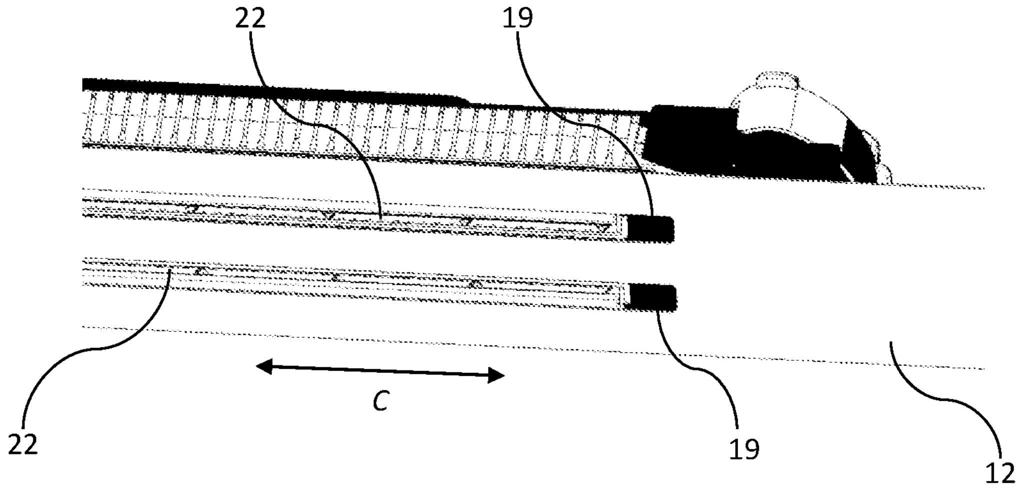
FIG. 4 is a magnified perspective of a conveyor tape engaged with a printhead.

After spitting, the conveyor tape 12 is rapidly repositioned and the printhead 5 is lowered further towards the platen 14 and into the printing position shown in FIG. 3C. In this printing position, the printhead 5 typically contacts the upper surface of the conveyor tape 12 and the longitudinal slots 19 are aligned with the rows of print chips 22 to provide a window for ink ejection. Thus, the two rows of print chips 22 are able to eject ink through respective longitudinal slots 19 and onto print media, as best seen in FIG. 4. During printing, and particularly during longer print jobs, condensate may build up on the lower surface of the conveyor tape 12. Accordingly, the conveyor tape 12 is reciprocally moved along the printhead 5 during printing in order to carry condensate away from a print zone 25. Such movement of the conveyor tape 12 during printing may be relatively slow (e.g. less than 20 mm/s or less than 10 mm/s). Once the condensate has been carried away from the print zone 25, it is removed from the lower surface of the conveyor tape 12 using a condensate scraper 26. Although only one set of scrapers is shown in FIG. 3A-C, it will be appreciated that the condensate scraper and the ink scraper may be placed on both sides of the print zone 25 so that movement of the conveyor tape 12 in either direction results in removal of condensate and ink.

In summary, the conveyor tape 12 ameliorates the deleterious effects of condensation on print quality by providing a mechanism for dynamically removing condensate from the print zone 25 during printing. Advantageously, the conveyor tape 12 may function additionally as an intermediate spittoon, thereby optimizing the health of nozzles by shortening the period between printhead wiping and a first post-wipe ink ejection. In this way, inkjet nozzles are less prone to clogging in the period between wiping and printing.

It will, of course, be appreciated that the present invention has been described by way of example only and that modifications of detail may be made within the scope of the invention, which is defined in the accompanying claims.

The invention claimed is:

1. A printing device comprising:

an inkjet printhead having a row of ink ejection devices;

a lift mechanism configured for raising and lowering the printhead between a maintenance position and a printing position;

a conveyor tape positioned below the printhead in the printing position, said conveyor tape defining a slot aligned with the row of ink ejection devices;

a tape movement mechanism for moving the conveyor tape longitudinally along the length of the printhead; and a condensate scraper positioned for scraping condensate away from an underside of the conveyor tape, wherein the tape movement mechanism is configured to move the conveyor tape along the printhead during printing, thereby conveying condensate accumulated on an underside of said conveyor tape away from the printhead.

2. The printing device of claim 1, wherein the condensate scraper is offset from the media feed path.

3. The printing device of claim 1, wherein the conveyor tape is comprised of a non-absorbent polymer.

4. The printing device of claim 1, wherein the slot is at least twice a length of the printhead.

5. The printing device of claim 1, wherein an upper surface of the conveyor tape contacts a lower surface of the printhead.

6. The printing device of claim 1, wherein the conveyor tape is tensioned between a pair of pulleys positioned at opposite ends of the printhead.

7. The printing device of claim 6, wherein the pulleys are positioned above or below a media feed path.

8. The printing device of claim 1, wherein the tape movement mechanism is configured to reciprocally move the conveyor tape along the printhead during printing.

9. The printing device of claim 1, wherein the conveyor tape includes an unslotted portion, said unslotted portion having a length equal to or greater than a length of the printhead.

10. The printing device of claim 9, wherein:

the lift mechanism is configured to position the printhead in a spitting position at a predetermined height above the conveyor tape, said spitting position being intermediate the maintenance position and the printing position; and the unslotted portion of the conveyor tape, when aligned with and positioned opposite the printhead in the spitting position, receives ink spitted from the printhead on an upper surface thereof.

11. The printing device of claim 10, further comprising an ink scraper positioned for scraping ink away from the upper surface of the conveyor tape.

* * * * *